United States Patent Office 3,850,923
Patented Nov. 26, 1974

3,850,923
PROCESS FOR PREPARING 1,5-DIACYL-3,7-ENDO-METHYLENE-1,3,5,7-TETRAAZACYCLOOCTANES
Victor I. Siele, Succasunna, N.J., assignor to the United States of America as represented by the Secretary of the Army
No Drawing. Filed Sept. 4, 1973, Ser. No. 394,238
Int. Cl. C07d 55/14
U.S. Cl. 260—248 NS        12 Claims

ABSTRACT OF THE DISCLOSURE 1,5 - Diacyl-3,7-endomethylene-1,3,5,7-tetraazacyclooctanes are produced by reacting hexamethylenetetramine (1,3,5,7-tetraazatricyclo(3,3,1,1)decane) with a monocarboxylic acid anhydride in aqueous medium, advantageously in the presence of an additional acid binding agent.

BACKGROUND OF THE INVENTION 1,5-Diacetyl-3,7-endomethylene-1,3,5,7-tetraazacyclooctane (DAPT) is useful as an intermediate for producing HMX (1,3,5,7-tetranitro - 1,3,5,7 - tetraazacyclooctane), which is the most powerful non-atomic explosive in military use. In the past DAPT has been prepared by reacting hexamethylenetetramine with acetic anhydride. The reaction always has been carried out under anhydrous conditions and resulted in poor yields of DAPT. Dominikiewicz (Chemical Abstracts 30, 1029 (1936)) obtained a 30% yield of DAPT by carrying out the reaction in anhydrous ether. G. C. Bassler ("The Chemistry of Cyclonite," Ph.D. Thesis 1943, Pennsylvania State College, page 175) obtained 10–19% yields by effecting the reaction in chloroform. Aristoff and coworkers (Can. J. Res. 27B, 520 (1949)) obtained a maximum yield of 6.5% of said compound by performing the reaction in the absence of any solvent or diluent.

SUMMARY OF THE INVENTION

An object of the present invention is to provide a process for the preparation of 1,5-diacyl-3,7-endomethylene-1,3,5,7-tetraazacyclooctanes in improved yields from hexamethylenetetramine and a monocarboxylic acid anhydride. Other objects will become apparent as the invention is further described.

In accordance with this invention there is provided a novel process for producing 1,5-diacyl-3,7-endomethylene-1,3,5,7-tetraazacyclooctanes, which comprises reacting hexamethylenetetramine (hereinafter referred to as hexamine) and a monocarboxylic acid anhydride defined below in aqueous medium, advantageously in the presence of an additional acid binding agent. By effecting the reaction in the presence of an aqueous medium an improved yield of DAPT can be obtained. The reaction is schematically represented as follows:

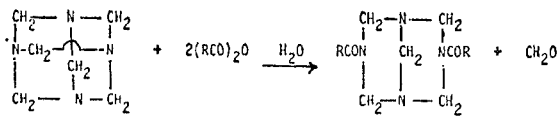

wherein R is hydrogen, phenyl or an alkyl radical containing 1 to 6 carbon atoms. Thus, it has been found that DAPT can be obtained in yields of 90% and higher by reacting the hexamine and acetic anhydride at low temperatures in the presence of water and an added acid binding agent, e.g. NaOH. This is considered surprising in view of the known high reactivity of acetic and other carboxylic acid anhydrides with aqueous bases, and in fact with water itself, and possibly explains why previous investigators used non-aqueous systems exclusively in the reaction.

DESCRIPTION OF THE PREFERRED EMBODIMENTS

A preferred embodiment of the process of the present invention comprises adding the carboxylic acid anhydride gradually to hexamine in the presence of water advantageously in the presence of an added acid binding agent, which may be introduced with the anhydride, if desired. In this manner side reactions are minimized, good control of the exothermic reaction is achieved and optimum yields of the desired product are obtained. The reaction ingredients can also be mixed together in any order.

Monocarboxylic acid anhydrides of the general formula $(RCO)_2O$ defined above, which can be employed in the present process include acetic anhydride, acetic formic anhydride, propionic anhydride, n-butyric anhydride, isobutyric anhydride, caproic anhydride, caprylic anhydride and benzoic anhydride.

The proportions of reactants employed in the process of this invention may be varied widely. For example, although the reaction theoretically requires two moles of the monocarboxylic acid anhydride per mole of hexamine, it is generally advantageous to employ an excess of the anhydride over this ratio to compensate for side reactions, notably reaction of the anhydride with water. Usually from about 2.5 to about 6 moles of monocarboxylic anhydride per mole of hexamine are employed. The use of relatively low reaction temperatures in the present process, as discussed below, minimizes the production of higher acyl derivatives even when considerably more than 2 moles of anhydride per mole of hexamine are employed.

In the present process, wherein hexamine is reacted with the monocarboxylic acid anhydride in aqueous medium, the hexamine base itself can function as an acid binding agent. However, it is advantageous to carry out the reaction in the presence of an additional acid binding agent capable of neutralizing the carboxylic acid formed in the reaction, since a further improvement in yield of the 1,5-diacyl compound is generally obtained thereby. Suitable acid binding agents include the hydroxides, carbonates bicarbonates, acetates and benzoates of the alkali metals, e.g. sodium, potassium and lithium, and alkali earth metals, e.g. calcium, magnesium and barium, and ammonium compounds, e.g. ammonium hydroxide ammonium carbonate and ammonium bicarbonate. The amount of additional acid binding agent, if employed, is usually equivalent to the moles of carboxylic acid anhydride employed, although larger or smaller amounts can also be used.

It is especially advantageous to carry out the present process in the presence of an inorganic ammonium compound, e.g. ammonium hydroxide and ammonium acetate, since it has been found that the ammonium compound reacts with the formaldehyde generated in the reaction to form additional hexamine in situ, which reacts with the anhydride and thereby increases the yield of the desired diacrylated product, as illustrated in Example 12 below.

The process of the present invention is generally conducted at temperatures between about 0° C. and about 60° C. However, the present process can be carried out with good results at lower temperatures, e.g. —20° C. and below provided a stirrable liquid reaction mixture is maintained and the use of such lower temperatures is within the scope of the present process; but operation at such lower temperatures is not preferred, since it requires costly cooling. Temperatures above 60° C. generally result in increased side reactions, lower yields and/or more impure products. The optimum reaction temperature will depend on a number of factors, particularly the reactivity of the monocarboxylic anhydride used, proportions of reactants, time of reaction, etc. For example, when acetic anhydride is employed as the acylating agent, the use of reaction temperatures above 20° C. leads to substantially increased side reactions and consequent decreased yields of the desired action temperature, proportions of reactants, type and concentration of added base, etc.

| Example | Hexa-mine, mole | AC₂O, mole | Base added | | Temp., °C. | Ac₂O addition time, | Aging time, min. | DAPT | | |
|---|---|---|---|---|---|---|---|---|---|---|
| | | | Type | Mole | | | | Parts | Melting point, °C. | Yield percent theory |
| 1 | 0.1 | 0.6 | NaOH | 0.6 | 10 | 60 | 60 | 20.85 | 185–189 | 98.1 |
| 2 | 0.1 | 0.2 | NaOH | 0.2 | 0 | 70 | 120 | 4.6 | 185–187 | 21.6 |
| 3 | 0.1 | 0.4 | NaOH | 0.4 | 0 | 115 | 60 | 10.35 | 189–192 | 48.9 |
| 4 | 0.1 | 0.4 | NaOH | 0.4 | −15 | 60 | 60 | 19.1 | 180–186 | 90 |
| 5 | 0.1 | 0.4 | NaOH | 0.4 | −15 | 130 | 120 | 21.05 | 180–186 | 99.4 |
| 6 | 0.1 | 0.6 | NaOH | 0.6 | −15 | 60 | 60 | 20.7 | 185–192 | 97.6 |
| 7 | 0.1 | 0.6 | Na₂CO₃ | 0.3 | 10 | 60 | 60 | 20.6 | 186–190 | 97.2 |
| 8 | 0.1 | 0.6 | NaHCO₃ | 0.6 | 10 | 60 | 60 | 20.97 | 183–189 | 98.9 |
| 9 | 0.1 | 0.6 | K₂CO₃ | 0.3 | 10 | 60 | 60 | 20.75 | 183–190 | 97.8 |
| 10 | 0.1 | 0.6 | KHCO₃ | 0.6 | 10 | 60 | 60 | 19.67 | 183–190 | 92.8 |
| 11 | 0.1 | 0.25 | None* | None* | 10 | 60 | 30 | 13.8 | 192 | 65 |

*The process of example 1 was repeated except that the solution of 24 parts NaOH in 120 parts water was omitted.

product; whereas higher reaction temperatures can be employed when a less reactive anhydride such as benzoic anhydride is used as the acylating agent.

The time required for completion of the acylation reaction to produce the desired 1,5-diacyl derivative is not critical and depends on a number of factors, e.g. the reactivity of the particular carboxylic anhydride used, reaction temperature, proportions of reactants present in the reaction mixture, and especially the rate of addition of the anhydride. Although the rate of the acylation reaction is fairly rapid, the anhydride is usually added slowly to the hexamine to minimize side reactions. Usually the total time required to complete the acylation reaction, including such addition of the anhydride, is about 1 to 2 hours.

The amount of water used in the reaction may also be varied widely. As little as 1 mole of water per mole of hexamine, or even less, can be advantageously employed. In the preferred procedure, wherein the anhydride is gradually added to an aqueous mixture containing the hexamine, an amount of water sufficient to provide a stirrable slurry can be used with good results, e.g. at least about four moles of water per mole of hexamine. However, larger amounts of water can be employed and the water may be used in mixture with an inert, solvent or diluent, e.g. acetone, if desired. As illustrated in the examples, the 1,5-diacyl-3,7-endomethylene - 1,3,5,7 - tetraazacyclooctane can be recovered by evaporating the aqueous reaction mixture to dryness, and purified by crystallization from a suitable solvent, such as acetone.

The following examples serve to illustrate specific embodiments of the method of carrying out the process of the present invention. It is to be understood that they are illustrative only and do not in any way limit the invention. The parts in the examples are parts by weight.

EXAMPLE 1

Preparation of DAPT

A solution of 14 parts (0.1 mole) of hexamine in 50 parts of water was added to a cold (10° C.), agitated solution of 24 parts (0.6 mole) of NaOH in 120 parts of water during about 5 minutes. 61.2 parts (0.6 mole) of acetic anhydride were then added with agitation during about one hour to the resulting mixture which was maintained at 10° C. The resulting clear solution was stirred for about 60 minutes "aging time" at 10° C. to complete the reaction and then evaporated to dryness in vacuo at 45–55° C. The white crystalline residue thus obtained (83.5 parts) was extracted with two portions of chloroform, each weighing 300 parts, and the chloroform extracts were evaporated to dryness. 20.85 parts of crude DAPT melting at 185–189° C. were thus obtained, corresponding to 98.1% of theory yield.

The following table sets forth the results obtained in the foregoing example and other examples conducted in similar manner. It is evident from the table that the process of the invention permits considerable variations in re-

EXAMPLE 12

Preparation of DAPT In The Presence of Ammonium Acetate 14 parts (0.1 mole) of hexamine and 6.2 parts (0.08 mole) of ammonium acetate were slurried in 7 parts of cold (5°–10° C.) water. 30.6 parts (0.3 mole) of acetic anhydride were stirred in dropwise over a period of 60 minutes while maintaining the temperature at 5°–10° C. When the addition was complete, the solution was agitated at 10° C. for 30 minutes and then evaporated to dryness in vacuo at about 50° C. Recrystallization of the crude product thus obtained (26.4 parts) from acetone gave 21.2 parts of DAPT of melting point 192° C., corresponding to 100% of theory yield.

EXAMPLE 13

Preparation of 1,5-Diformyl-3,7-endomethylene-1,3,5,7-tetraazacyclooctane

Acetic formic anhydride (132 parts, 1.5 moles, prepared by the method of L. F. Fieser and M. Fieser, "Reagents For Organic Synthesis," Wiley, New York, 1967, page 4) was added dropwise with stirring during 120 minutes to a solution consisting of sodium acetate (123 parts, 1.5 moles), hexamine (70 parts, 0.5 mole) and water (500 parts) maintained at 0–10° C. When the addition was complete, the solution was agitated at about 0–10° C. for one hour to complete the reaction and then evaporated in vacuo to a wet, acidic solid. The solid was dissolved in 250 parts of water, and the solution was rendered alkaline with sodium carbonate and evaporated in vacuo to a white solid. The white solid was dried under vacuum over solid NaOH and then extracted with three portions of acetone, each portion amounting to 710 parts. The extracts were filtered, combined, evaporated to a weight of about 200 parts and allowed to cool and crystallize. The crude product thus obtained melted at 235–244° C. and weighed 24 parts. The crude product was purified by crystallization from acetone. 20.1 parts of purified product melting at 249–252° C. were obtained, which corresponds to 22% of the theoretical yield.

| Analysis | Calc'd | Found |
|---|---|---|
| Carbon | 45.7 | 46.0 |
| Hydrogen | 6.6 | 6.7 |
| Nitrogen | 30.4 | 30.1 |
| Mol. wt. | 184 | [1]184 |

[1] Mass spectrometric.

The NMR spectrum agreed with the assigned structure.

EXAMPLE 14

Preparation of 1,5-Di-n-propionyl-3,7-endomethylene-1,3,5,7-tetraazacyclooctane

The procedure of Example 13 was repeated using a molecular equivalent proportion of n-propionic anhydride in place of acetic formic anhydride. The product melted at 131.5–132.5° C. and was obtained in 52% of theory yield.

| Analysis | Calc'd | Found |
|---|---|---|
| Carbon | 55.0 | 55.0 |
| Hydrogen | 8.4 | 8.5 |
| Nitrogen | 23.3 | 23.0 |
| Mol. wt | 240 | 263 |

The NMR spectrum agreed with the assigned structure.

EXAMPLE 15

Preparation of 1,5-Di-n-butyryl-3,7-endomethylene-1,3,5,7-tetraazacyclooctane

The procedure described in Example 13 was repeated using a molecular equivalent proportion of n-butyric anhydride. The product had a melting point of 84.5–87° C. and a mol wt. of 270 (calc. 268), and was obtained in 52% of theory yield. The NMR spectrum agreed with the assigned structure.

EXAMPLE 16

Preparation of 1,5-Dibenzoyl-3,5-endomethylene-1,3,5,7-tetraazacyclooctane

The procedure described in Example 13 was followed, using a molecular equivalent proportion of benzoic anhydride, except that a reaction temperature of 55° C. was employed. The product melted at 179–181° C. and was obtained in 13% of theory yield.

| Analysis | Calc'd | Found |
|---|---|---|
| Carbon | 67.8 | 67.9 |
| Hydrogen | 6.0 | 6.1 |
| Mol. wt | 336 | 335 |

The NMR spectrum agreed with the assigned structure.

In the preparation of HMX from DAPT, the DAPT is first dinitrated to produce DADN (1,5-diacetyl-3,7-dinitro-1,3,5,7-tetraazacyclooctane) by means of a suitable nitrating agent, e.g. a mixture of nitric and sulfuric acids, and the DADN is further nitrated to produce HMX. In the past the preparations of DAPT and DADN have been carried out in separate operations. However, we have found that DADN can be produced in high yield and purity without the need for isolating the intermediate DAPT, by preparing DAPT according to the process of the present invention and adding the resulting reaction mixture to the mixture of nitric and sulfuric acids as described in the following example.

EXAMPLE 17

Hexamine (14 parts, 0.1 mole) and ammonium acetate (6.2 parts, 0.08 mole) were stirred into water (7 parts) at 5–10° C. Acetic anhydride (30.6 parts, 0.3 mole) was added dropwise to the resulting slurry with agitation during 60 minutes while maintaining the temperature at 5–10° C. When the addition was complete, the clear solution thus obtained was agitated at 5–10° C. for about 30 minutes to ensure completion of the reaction. The solution was then added dropwise during 80 minutes to a vigorously agitated mixture of 99+% nitric acid (63 parts, 1.0 mole) and 96% sulfuric acid (221 parts, 2.26 moles) while maintaining the temperature at 18–20° C. When the addition was complete, the reaction mixture was stirred at 20° C. for about 20 minutes and then poured onto ice (1000 parts). The iced mixture was diluted with 1500 parts of cold water and the resulting precipitate was separated by filtration, washed with 5 portions of water each amounting to 250 parts and air dried at ambient temperature. 27.7 parts of DADN of melting point 265° C. were obtained, corresponding to 96% of the theoretical yield based on hexamine.

| Analysis | Calc'd for $C_8H_{14}N_6O_6$ | Found |
|---|---|---|
| Carbon | 33.10 | 33.07 |
| Hydrogen | 4.86 | 4.95 |
| Nitrogen | 28.96 | 29.23 |

The NMR spectrum agreed with the assigned structure.

The foregoing disclosure is merely illustrative of the principles of this invention and are not to be interpreted in a limiting sense. I wish it to be understood that I do not desire to be limited to exact details of construction shown and described for obvious modifications will occur to a person skilled in the art.

What is claimed is:

1. A process for the preparation of a 1,5-diacyl-3,7-endomethylene-1,3,5,7-tetraazacyclooctane, which comprises reacting hexamethylenetetramine and a monocarboxylic acid anhydride of the general formula $(RCO)_2O$, wherein R is hydrogen, phenyl or an alkyl radical containing 1 to 6 carbon atoms, in the presence of water.

2. The process according to claim 1, wherein the amount of water is at least 1 mole per mole of hexamethylenetetramine.

3. The process according to claim 1, wherein the reaction is carried out at a temperature not exceeding 60° C.

4. The process according to claim 1, wherein the anhydride is acetic anhydride.

5. The process according to claim 4, wherein the reaction is carried out in the presence of ammonium acetate.

6. The process according to claim 1, wherein the anhydride is gradually added to the hexamethylenetetramine.

7. The process according to claim 1, wherein the reaction is carried out in the presence of an additional acid binding agent.

8. The process according to claim 7, wherein the acid binding agent is selected from the group consisting of ammonium and alkali metal hydroxides, carbonates and bicarbonates.

9. The process according to claim 7, wherein the anhydride is acetic anhydride.

10. The process according to claim 9, wherein the reaction is carried out at a temperature between about −20° C., and +20° C.

11. The process according to claim 7, wherein the amount of water is at least 1 mole per mole of hexamethylenetetramine.

12. The process according to claim 7, wherein the anhydride is gradually added to the hexamethylenetetramine.

References Cited

Dominikiewicz, Chemical Abstracts, vol. 30, 1029 (1936).

Aristoff et al., Can. J. Res., 27B, 520 (1949).

JOHN M. FORD, Primary Examiner